US012678896B2

(12) United States Patent
Yahagi et al.

(10) Patent No.: US 12,678,896 B2
(45) Date of Patent: *Jul. 14, 2026

(54) FLUX

(71) Applicant: KOKI COMPANY LIMITED, Tokyo (JP)

(72) Inventors: Takeshi Yahagi, Tokyo (JP); Ryo Kamio, Tokyo (JP)

(73) Assignee: KOKI COMPANY LIMITED, Tokyo (JP)

( * ) Notice: Subject to any disclaimer, the term of this patent is extended or adjusted under 35 U.S.C. 154(b) by 479 days.

This patent is subject to a terminal disclaimer.

(21) Appl. No.: 18/039,077

(22) PCT Filed: Dec. 22, 2021

(86) PCT No.: PCT/JP2021/047676
§ 371 (c)(1),
(2) Date: May 26, 2023

(87) PCT Pub. No.: WO2022/138755
PCT Pub. Date: Jun. 30, 2022

(65) Prior Publication Data
US 2024/0001492 A1     Jan. 4, 2024

(30) Foreign Application Priority Data
Dec. 23, 2020 (JP) ................................. 2020-214336

(51) Int. Cl.
*B23K 35/36* (2006.01)
*B23K 35/362* (2006.01)
(52) U.S. Cl.
CPC ........ *B23K 35/3613* (2013.01); *B23K 35/362* (2013.01)

(58) Field of Classification Search
CPC .............. B23K 35/3613; B23K 35/362; B23K 35/025; B23K 35/262
(Continued)

(56) References Cited

U.S. PATENT DOCUMENTS

| | | | |
|---|---|---|---|
| 2010/0240806 A1 | 9/2010 | Kondo | |
| 2020/0130110 A1 | 4/2020 | Kitazawa et al. | |
| 2021/0069837 A1 | 3/2021 | Kajikawa et al. | |

FOREIGN PATENT DOCUMENTS

| | | | | |
|---|---|---|---|---|
| JP | H11106403 A | * | 4/1999 | |
| JP | 2009203559 A | * | 9/2009 | |

(Continued)

OTHER PUBLICATIONS

Tanaka et al. [JP2019198871A] (Espacenet English machine translation cited and attached) (Year: 2019).*

(Continued)

*Primary Examiner* — Sally A Merkling
*Assistant Examiner* — Nazmun Nahar Shams
(74) *Attorney, Agent, or Firm* — Kilyk & Bowersox, P.L.L.C.

(57) ABSTRACT

An aggregated cellulose is provided that includes massive cellulose and fibrous cellulose mixed together. The massive cellulose is fibrous and has a length of from 1 μm or more to less than 1 mm. The fibrous cellulose has a length of from 1 nm or more to less than 1 μm. The aggregated cellulose can contain from 400 ppm or more to 10,000 ppm or less of the massive cellulose. The aggregated cellulose can contain a solvent, a rosin-based resin, and an activator.

4 Claims, 14 Drawing Sheets

(58) Field of Classification Search
USPC ........................................................ 148/23
See application file for complete search history.

(56) References Cited

FOREIGN PATENT DOCUMENTS

| JP | 2011177774 | A | | 9/2011 | | |
| JP | 2014219522 | A | | 11/2014 | | |
| JP | 6540833 | B1 | | 6/2019 | | |
| JP | 2019171474 | A | | 10/2019 | | |
| JP | 2019198871 | A | | 11/2019 | | |
| JP | 2019198875 | A | | 11/2019 | | |
| JP | 6700570 | B1 | | 5/2020 | | |
| WO | WO-2014175244 | A1 | * | 10/2014 | ................. | C08L 7/00 |
| WO | 2019013158 | A1 | | 1/2019 | | |
| WO | WO-2019230573 | A1 | * | 12/2019 | ............. | C08K 5/092 |

OTHER PUBLICATIONS

Kakutani Takenori, et.al. [WO2014175244A1] (Espacenet English machine translation cited and attached) (Year: 2014).*
Matsusue Ikko, [WO2019230573A1] (machine translation) (Year: 2019).*
Takami Ken, [JPH11106403A] (machine translation) (Year: 1999).*
Omura Masaya, et.al. [JP2009203559A] (machine translation) (Year: 2009).*
Tetsuo Kondo, Preparation of Single Cellulose Nanofibers Dispersed in Water Using Aqueous Counter Collision Method, Graduate School of Bioresource and Bioenvironmental Sciences, Kyushu University, 6-10-1, Hakozaki, Higashi-ku, Furuoka 812-8581 Japan.
Gary Chinga-Carrasco, Cellulose Fibres, nanofibrils and microfibrils: The morphological sequence of MFC components from a plant physiology and fibre technology point of view, Nanoscale Research Letters, a SpringerOpen Journal, 2011, 6:417.
Hiroshi Ougiya et al., Relationship between the Physical Properties and Surface Area of Cellulose Derived from Adsorbates of Various Molecular Sizes, BioSci. Biotechnol. Biochem, 62 (10), 1880-1884, 1998.
Jiang et al., Rice Straw Cellulose Nanofibrils vis Aqueous Counter Collosion and Differential Centrifugation and Their Self-Assembled Structures/ACS Substainable chem. Eng., 2016, 4, 1697-1706 (P1698,P1699, P1701), Published Jan. 17, 2016.
Catalog "nanoforest" by Chuetsu Pulp & Paper Co., Ltd., Sep. 2018 (with concise explanations of the relevant portions provided in the English language, in the transmittal letter accompanying this form).
Press Release " Application of ACC-CNF to the Electronics Field—Application to Bonding Materials for Electronic Components" by Chuetsu Pulp & Paper Co., Ltd., Nov. 16, 2020.

* cited by examiner

1

FLUX

TECHNICAL FIELD

The present invention relates to a flux.

BACKGROUND ART

A solder used for bonding electronic components and the like is made of a solder material or the like containing a solder alloy and a flux. The flux is blended to improve solderability, and contains various components such as a resin component, an activator component, a solvent component, an antioxidant component, and a thixotropic component (also called a thixotropic agent component). Each of the components also includes a compound that generates a gas during heating, and a void due to the gas may be generated in a solder joint. Since this void causes a decrease in heat dissipation properties of an electrical connection portion and the like, it has been conventionally studied to suppress generation of the void.

For example, Patent Document 1 describes a flux containing an organic acid which is a dibasic carboxylic acid having 3 to 6 carbon atoms.

Patent Document 2 describes a flux containing an iodine-containing compound.

Patent Document 3 describes a flux containing an activator containing a specific carboxylic acid adduct and amines.

Patent Document 4 describes a flux containing an organic acid having a boiling point of 150° C. or higher and 300° C. or lower and 1 to 6 carbon atoms.

On the other hand, in the case of an electronic component such as a quad flat non-lead (QFN) or a power transistor, a bonding area of the solder is relatively large, and in the case of a small package component such as BGA (Ball Grid Array), CSP (Chip Size Package), or LGA (Land Grid Array), the bonding area is small. Since a mechanism of generating a void is different between a case where the bonding area of the solder is large and a case where the bonding area of the solder is small, it has been necessary to examine whether or not a flux having a void suppressing effect can also be applied to each bonding component.

Although there are various sizes of voids, such as voids having a relatively large size and very small voids called so-called champagne voids in which a large number of fine foam-like voids are generated, it is difficult to suppress these various types of voids with a conventional flux.

DOCUMENTS FOR PRIOR ART

Patent Documents

Patent Document 1: JP 6700570 B2
Patent Document 2: JP 2019-198875 A
Patent Document 3: JP 6540833 B2
Patent Document 4: JP 2019-171474 A

SUMMARY OF INVENTION

Problem to be Solved by the Invention

The present invention has been made in view of the above-described problems of the prior art, and an object of the present invention is to provide a flux capable of suppressing generation of various types of voids.

Means for Solving the Problems

The flux of the present invention contains massive cellulose in which fibrous cellulose having a length of 1 μm or more and less than 1 mm and fibrous cellulose having a length of 1 nm or more and less than 1 μm are mixed.

The present invention may contain 400 ppm or more and 10,000 ppm or less of the massive cellulose.

The present invention may further include a solvent, a rosin-based resin, and an activator.

Effects of Invention

According to the present invention, it is possible to provide a flux capable of suppressing generation of various types of voids.

DESCRIPTION OF EMBODIMENTS

Figure 1:
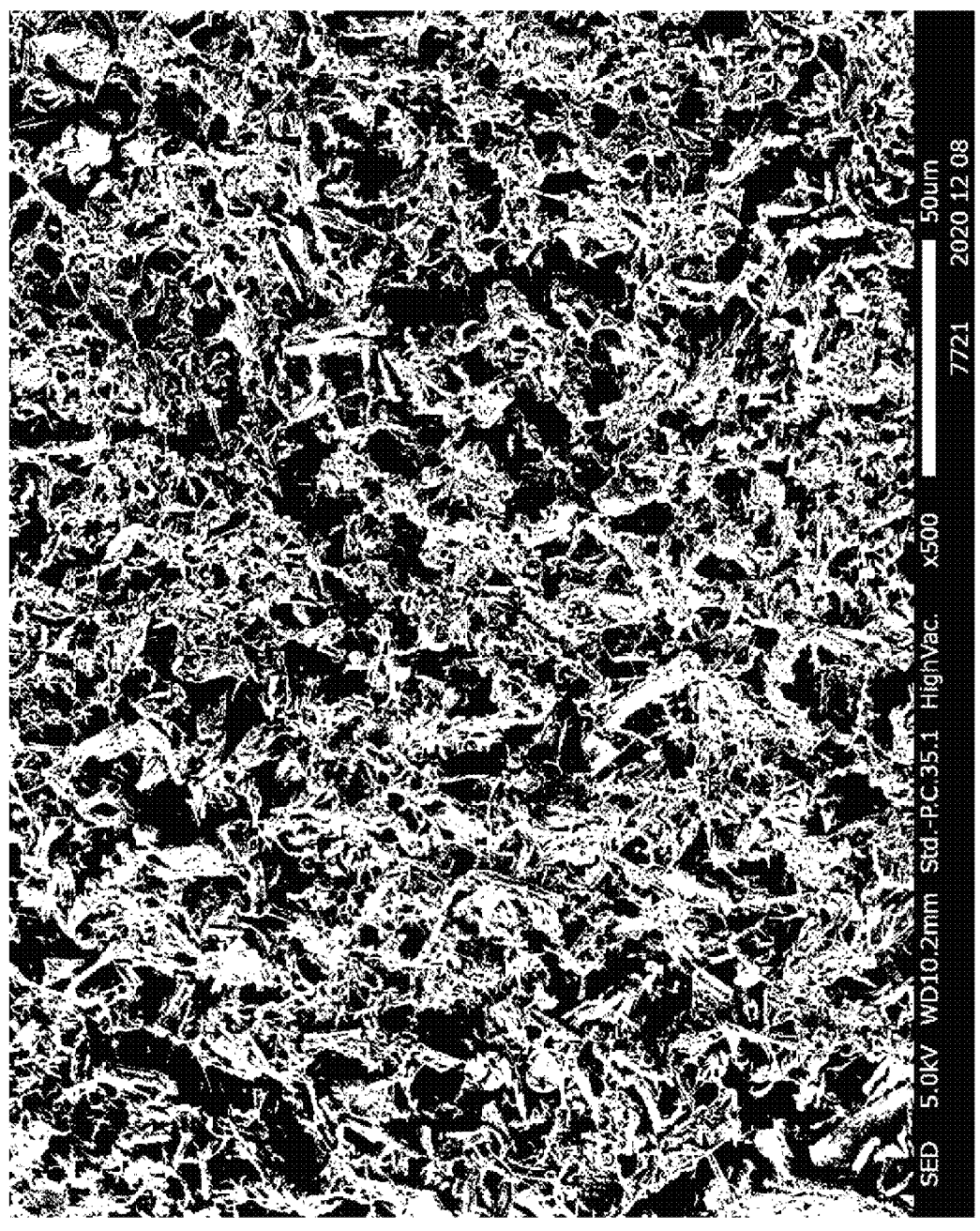
FIG. 1 is an electron micrograph of cellulose used in Comparative Example.

Hereinafter, a flux according to the present invention will be described.

The flux of the present embodiment is a flux that contains massive cellulose in which fibrous cellulose having a length of 1 μm or more and less than 1 mm and fibrous cellulose having a length of 1 nm or more and less than 1 μm are mixed.

The massive cellulose contained in the flux of the present embodiment is fibrous cellulose made of cellulose such as methyl cellulose, ethyl cellulose, or hydroxyethyl cellulose, and is massive cellulose in which fibrous cellulose having a length of 1 μm or more and less than 1 mm and fibrous cellulose having a length of 1 nm or more and less than 1 μm are mixed.

The massive cellulose of the flux of the present embodiment is a powder matter made of massive cellulose in which fine fibers having different lengths are entangled.

In the present embodiment, the length of the fibrous cellulose is the length of the fiber measured in an electron micrograph taken by a method shown in Example described later.

The massive cellulose is not particularly limited as long as it is massive cellulose in which fibrous celluloses having different lengths are mixed as described above, and examples of such massive cellulose include cellulose fibers called "microfibrillated cellulose (MFC)". The microfibrillated cellulose is also called "cellulose microfiber", and is cellulose in which various cellulose raw materials are mechanically and/or chemically treated to increase the specific surface area and adjust the diameter and length of fibers.

The raw material of the cellulose microfiber is any cellulose material, and is not particularly limited, and examples thereof include natural materials such as wood and chemically synthesized cellulose fibers.

The massive cellulose contained in the flux of the present embodiment may be obtained from a commercially available product. Examples thereof include Exilva (manufactured by Borregaard AS) and BiNFi-s (manufactured by Sugino Machine Limited).

The flux of the present embodiment may contain 400 ppm or more and 10,000 ppm or less, 500 ppm or more and 9,000 ppm or less, or 1,000 ppm or more and 8,500 ppm or less of the massive cellulose.

When the concentration of the massive cellulose is within the above range, a viscosity of the flux can be properly adjusted while suppressing generation of a void.

In the present embodiment, the concentration of the massive cellulose means an effective cellulose equivalent (ppm). The effective cellulose equivalent is a value measured by a measurement method of Examples described later.

In this method, the effective cellulose equivalent can also be determined from a solder material such as a solder paste. In this case, a flux content in the solder material is measured based on the test method of JIS Z 3197, and the effective cellulose equivalent (ppm) is measured from the flux content based on the following formula.

Effective cellulose equivalent (ppm)=weight (g) of separated and extracted cellulose/(weight (g) of solder material used in extraction operation×1 million×determined flux content (%)/100)×1 million The flux of the present embodiment may contain any other component generally contained in the flux, and for example, may further contain a solvent, a rosin-based resin, and an activator.

The solvent is not particularly limited as long as it is a known component used as a solvent component of the flux. Examples thereof include glycol ethers such as diethylene glycol monohexyl ether, diethylene glycol dibutyl ether, diethylene glycol mono-2-ethylhexyl ether, diethylene glycol monobutyl ether, tripropylene glycol monobutyl ether, polypropylene glycol monobutyl ether, triethylene glycol monobutyl ether, and polyethylene glycol dimethyl ether; aliphatic compounds such as n-hexane, isohexane, n-heptane, octane, and decane; esters such as isopropyl acetate, methyl propionate, ethyl propionate, tris(2-ethylhexyl) trimellitate, tributyl acetylcitrate, and diethylene glycol dibenzoate; ketones such as methyl ethyl ketone, methyl-n-propyl ketone, and diethyl ketone; alcohols such as ethanol, n-propanol, isopropanol, isobutanol, octanediol, and 3-methyl-1, 5-pentanediol; and carboxylic acids such as hexanoic acid, heptanoic acid, octanoic acid, 2-ethylhexanoic acid, nonanoic acid, and decanoic acid.

The solvent can be used alone or in combination of two or more kinds thereof.

The content of the solvent component in the flux is not particularly limited, and is, for example, 20% by mass or more and 70% by mass or less, preferably 30% by mass or more and 60% by mass or less.

Examples of the rosin-based resin include rosin and a resin that is a derivative of rosin, and the rosin-based resin is not particularly limited as long as it is a known rosin-based resin used as a resin component of a flux. Specific examples thereof include rosin derivative resins such as rosin, hydrogenated rosin, polymerized rosin, disproportionated rosin, maleic acid-modified rosin, maleic acid-modified hydrogenated rosin, acrylic acid-modified rosin, acrylic acid-modified hydrogenated rosin, and pentaerythritol ester.

The rosin-based resin can be used alone or in combination of two or more kinds thereof.

The content of the rosin-based resin in the flux of the present embodiment is not particularly limited, and is, for example, 20% by mass or more and 95% by mass or less, preferably 25% by mass or more and 90% by mass or less, more preferably 30% by mass or more and 80% by mass or less. When the content of the rosin-based resin is within the above range, it is preferable from the viewpoint of solderability.

The activator is not particularly limited as long as it is a known component used as an activator component or the like of the flux. For example, a halogen-based activator such as an organic acid, an amine halogen salt, or a halogen compound, an isocyanuric acid derivative activator, an imidazole-based activator, or the like can be used.

Examples of the organic acid include adipic acid, malonic acid, maleic acid, glutaric acid, succinic acid, methylsuccinic acid, azelaic acid, sebacic acid, stearic acid, benzoic acid, dodecanedioic acid, and cyanuric acid.

Examples of the halogen-based activator include 2,3-dibromo-2-butene-1,4-diol, diiodooctane, and diiodobiphenyl.

Examples of the isocyanuric acid derivative activator include tris(3-carboxypropyl) isocyanurate, tris(2-carboxyethyl) isocyanurate, and bis(2-carboxyethyl) isocyanurate.

Examples of the imidazole-based activator include imidazole, 2-methylimidazole, 2-ethylimidazole, 2-vinylimidazole, 2-propylimidazole, 2-isopropylimidazole, 2-phenylimidazole, 2-undecylimidazole, 2-heptadecylimidazole, 1,2 dimethylimidazole, 2-ethyl-4-methylimidazole, and 2-phenyl-4-methylimidazole.

The activator can be used alone or in combination of two or more kinds thereof.

The total amount of the activator in the flux is not particularly limited, and is, for example, 0.1% by mass or more and 20% by mass or less, or 1% by mass or more and 10% by mass or less.

When the content of the activator is within the above range, it is preferable from the viewpoint of maintaining soldering while suppressing generation of a void.

The flux of the present embodiment may further contain a thixotropic component.

The thixotropic component is not particularly limited as long as it is a known component used as the thixotropic component of the flux. Examples thereof include fatty acid amides, hydrogenated castor oil, oxyfatty acids, and waxes.

The thixotropic component can be used alone or in combination of two or more kinds thereof.

The content of the thixotropic component in the flux is not particularly limited, and is, for example, 3.0% by mass or more and 20% by mass or less, preferably 4.5% by mass or more and 10% by mass or less.

The flux of the present embodiment may further contain other additives. For example, cellulose other than the massive cellulose may be contained as a thickener.

Each of these components can be blended in the flux as necessary, and any component may or may not be contained.

The flux of the present embodiment can be used as a flux for a solder material such as a solder paste or a resin flux cored solder, and can also be used as a liquid flux such as a post flux.

The flux of the present embodiment is a flux for a solder material.

Examples of the solder material using the flux of the present embodiment include those containing each flux and a solder alloy.

The solder alloy may be a lead-free alloy.

The solder alloy is not particularly limited and may be either a lead-free (unleaded) solder alloy or a leaded solder alloy, and from the viewpoint of the impact on the environmental, the lead-free solder alloy is preferable.

Specific examples of the lead-free solder alloy include alloy containing tin, silver, copper, zinc, bismuth, antimony, or indium, and more specific examples include alloy such as Sn/Ag, Sn/Ag/Cu, Sn/Cu, Sn/Aq/Bi, Sn/Bi, Sn/Ag/Cu/Bi, Sn/Sb, Sn/Zn/Bi, Sn/Zn, Sn/Zn/Al, Sn/Ag/Bi/In, Sn/Ag/Cu/Bi/In/Sb, and In/Sn. Particularly, Sn/Ag/Cu is preferable.

The content of the solder alloy in the solder material is not particularly limited, and is, for example, 80% by mass or more and 95% by mass or less, preferably 85% by mass or more and 90% by mass or less.

When the solder material in the present embodiment is a solder paste obtained by mixing a solder alloy and the flux of the present embodiment, for example, it is preferable that the solder alloy is mixed at 80% by mass or more and 95% by mass or less and the flux is mixed at 5% by mass or more and 20% by mass or less.

The conditions in the case of using the solder material in the present embodiment can be appropriately set according to an object to be solder-joined and the like, and are not particularly limited, and examples thereof include conditions such as a temperature rise rate during preheating: 1.0 to 3.0° C./sec, a preheat temperature: 150 to 180° C./60 to 100 sec, a temperature rise rate during solder melting: 1.0 to 2.0° C./sec, a melting temperature: 219° C. or higher and 30 seconds or more, and a reflow peak temperature: 230 to 250° C.

The solder material using the flux of the present embodiment is suitable for electrical connection of electronic components, particularly all electronic components such as in-vehicle devices, outdoor displays, and mobile phones.

In particular, void generation can be suppressed well even when solder areas are different, such as connection of electronic components solder-joined in a relatively large area, such as a quad flat non-lead (QFN) or a power transistor, and those solder-joined in a relatively small area, such as a small package component such as BGA (Ball Grid Array), CSP (Chip Size Package), or LGA (Land Grid Array).

In addition, the flux of the present embodiment can also suppress generation of a very small void called a so-called champagne voids in which a large number of fine foam-like voids are generated. That is, various types of voids can be suppressed.

Although the flux according to the present embodiment is as described above, it should be considered that the embodiment disclosed herein is an example in all respects and is not restrictive. The scope of the present invention is indicated not by the above description but by the claims, and it is intended that meanings equivalent to the claims and all modifications within the scope are included.

EXAMPLES

Next, Examples of the present invention will be described together with Comparative Examples. The present invention is not to be construed as being limited to the following Examples.

Preparation of Flux

Fluxes used in Examples and Comparative Examples were prepared with the materials and formulations shown in Table 1.

In the preparation method, each material was put into an appropriate container, heated to around 200° C., and mixed and dispersed until all the materials were uniformly dissolved to obtain each flux.

Details of each material shown in Table 1 are shown below.

A cellulose content of each material is described in parentheses of a cellulose component.

Solvent Component

Pinecrystal KE-604 (manufactured by Arakawa Chemical Industries, Ltd.)

Diethylene glycol monohexyl ether (manufactured by NIPPON NYUKAZAI CO., LTD., trade name: HeDG)

Thixotropic Component

Hexamethylene bishydroxystearic acid amide (manufactured by Mitsubishi Chemical Corporation, trade name: Slipax ZHH)

Activator Component

Trans-2,3-dibromo-2-butene-1,4-diol (manufactured by Tokyo Chemical Industry)

Succinic acid (manufactured by Tokyo Chemical Industry)

Maleic acid (manufactured by Tokyo Chemical Industry)

Tris(3-carboxypropyl)isocyanurate (manufactured by Shikoku Chemicals Corporation)

Cellulose Component

Cellulose microfiber 1 (2 wt %) (manufactured by Borregaard AS, trade name Exilva)

Cellulose microfiber 2 (10 wt %) (manufactured by Borregaard AS, trade name Exilva)

Cellulose powder 1 (93 wt %) (manufactured by Nippon Paper Industries Co., Ltd., trade name: NP fiber)

Cellulose powder 2 (93 wt %) (manufactured by Nippon Paper Industries Co., Ltd., trade name: KC Flock Cell lose nanofiber 1 (1 wt %) (manufactured by Nippon Paper Industries Co., Ltd., trade name: cellenpia TC-01A)

Cellulose nanofiber 2 (1 wt %) (DKS Co. Ltd., trade name: Rheocrysta)

Cellulose powder impregnation liquid 1 (10 wt %) (cellulose powder 1 impregnated/dispersed in pure water so as to have a content of 10 wt %)

Cellulose powder impregnation liquid 2 (10 wt %) (cellulose powder 2 impregnated/dispersed in pure water so as to have a content of 10 wt %)

TABLE 1

| | Example 1 | Example 2 | Example 3 | Example 4 | Example 5 | Example 6 | Example 7 | Example 8 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|---|---|---|---|---|---|
| Pinecrystal KE-604 | 48.7 | 47.9 | 45.9 | 49.1 | 48.7 | 47.9 | 48.1 | 45.9 | 50.0 | 49.6 | 45.9 | 49.6 | 49.6 | 45.9 | 49.6 | 45.9 | 45.9 | 45.9 |
| Diethylene glycol monohexyl ether | 39.0 | 38.3 | 36.7 | 39.3 | 39.0 | 38.3 | 38.5 | 36.7 | 40.0 | 39.6 | 36.7 | 39.6 | 39.6 | 36.7 | 39.6 | 36.7 | 36.7 | 36.7 |
| Hexamethylene bishydroxystearic acid amide | 5.4 | 5.3 | 5.0 | 5.4 | 5.4 | 5.3 | 5.3 | 5.0 | 5.5 | 5.5 | 5.0 | 5.5 | 5.5 | 5.0 | 5.5 | 5.0 | 5.0 | 5.0 |
| Trans-2,3-dibromo-2-butene-1,4-diol | 0.5 | 0.5 | 0.5 | 0.5 | 0.5 | 0.5 | | 0.5 | 0.5 | 0.5 | 0.5 | 0.5 | 0.5 | 0.5 | 0.5 | 0.5 | 0.5 | 0.5 |
| Succinic acid | 1.8 | 1.7 | 1.7 | 1.8 | 1.8 | 1.7 | 1.7 | 1.7 | 1.8 | 1.8 | 1.7 | 1.8 | 1.8 | 1.7 | 1.8 | 1.7 | 1.7 | 1.7 |
| Maleic acid | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| Tris(3-carboxypropyl) isocyanurate | 1.8 | 1.7 | 1.7 | 1.8 | 1.8 | 1.7 | 1.7 | 1.7 | 1.8 | 1.8 | 1.7 | 1.8 | 1.8 | 1.7 | 1.8 | 1.7 | 1.7 | 1.7 |
| Cellulose microfiber 1 (2 wt %) | 2.6 | 4.3 | 8.3 | | | | | | | | | | | | | | | |
| Cellulose microfiber 2 (10 wt %) | | | | 1.8 | 2.6 | 4.3 | 4.3 | 8.3 | | | | | | | | | | |
| Cellulose powder 1 (93 wt %) | | | | | | | | | | 0.9 | 8.3 | | | | | | | |
| Cellulose powder 2 (93 wt %) | | | | | | | | | | | | 0.9 | | | | | | |
| Cellulose nanofiber 1 (1 wt %) | | | | | | | | | | | | | 0.9 | 8.3 | | | | |
| Cellulose nanofiber 2 (1 wt %) | | | | | | | | | | | | | | | 0.9 | 8.3 | | |
| Cellulose powder impregnation liquid 1 (10 wt %) | | | | | | | | | | | | | | | | | 8.3 | |
| Cellulose powder impregnation liquid 2 (10 wt %) | | | | | | | | | | | | | | | | | | 8.3 |
| Effective cellulose equivalent (ppm) | 520 | 860 | 1660 | 1800 | 2600 | 4300 | 4300 | 8300 | 0 | 8370 | 77190 | 8370 | 90 | 830 | 90 | 830 | 8300 | 8300 |

TABLE 1-continued

| | Example 1 | Example 2 | Example 3 | Example 4 | Example 5 | Example 6 | Example 7 | Example 8 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|---|---|---|---|---|---|
| Void fraction (power transistor) | 17.0 | 17.7 | 14.5 | 8.8 | 14.8 | 15.7 | 17.6 | 15.7 | 25.8 | 27.8 | 24.3 | 29.7 | 30.6 | 14.6 | 25.7 | 28.8 | 37.2 | 38.3 |
| Evaluation | Good | Good | Good | Good | Good | Good | Good | Good | NA | NA | NA | NA | NA | Good | NA | NA | NA | NA |
| Void fraction (BGA) | 3.1 | 3.1 | 0.9 | 1.8 | 0.9 | 0.9 | 0.9 | 0.8 | 4.9 | 4.4 | 7.1 | 3.6 | 5.1 | 5.6 | 5.2 | 5.7 | 4.8 | 3.6 |
| Evaluation | Good | Good | Good | Good | Good | Good | Good | Good | NA | NA | NA | Good | NA | NA | NA | NA | NA | Good |

The unit of the numerical value regarding the component in the table is % by weight except for the effective cellulose equivalent. The effective cellulose equivalent indicates the content as cellulose in the flux in ppm.

A method of calculating the effective cellulose equivalent (ppm) is as follows.

$$\text{Effective cellulose equivalent (ppm)} = \text{content (wt \%)} \text{ in cellulose material} \times \text{added amount(wt \%) in flux} \times 100$$

The measurement method is as follows.

First, cellulose is subjected to separatory extraction using a more appropriate solvent species from the flux. The resulting cellulose suspension is dried and weighed. Qualitative analysis of cellulose is performed using a Fourier transform infrared spectrophotometer (FT-IR) (Frontier, manufactured by PerkinElmer Co., Ltd.).

A method of measuring the effective cellulose equivalent (ppm) is as follows.

$$\text{Effective cellulose equivalent (ppm)} = \text{weight (g) of separated and extracted cellulose/weight (g) of flux used in extraction operation} \times 1 \text{ million}$$

Solder Paste

A solder alloy powder (Sn-3% Ag-0.5% Cu, particle size 20 to 38 μm) and the flux were mixed at a ratio of 89% by mass to 11% by mass to prepare each paste-like solder material (solder paste).

Test Piece

Two types of test pieces were provided.

As a test piece for large-area solder, a copper clad laminate having a size of 100 mm×100 mm and a thickness of 1.6 mm was provided, and the solder paste of each of Examples and Comparative Examples was applied so as to have a thickness of 120 μm and a size of 5.6 mm×5.6 mm square, thereby providing a component (power transistor, TO-252, Sn plating treatment) mounted on the application portion and heat-treated.

As a test piece for small-area solder, the solder paste of each of Examples and Comparative Examples was applied as circles having a thickness of 120 μm and a diameter of 0.4 mm to a substrate similar to the copper clad laminate at intervals of 0.8 mm, and a 0.8 mm pitch BGA component (Sn-3% Ag-0.5% Cu ball) mounted thereon and heat-treated was provided.

Printing conditions and heating conditions are shown below.

Printing Conditions

Printing machine: YSP (manufactured by Yamaha Corporation)

Printing speed: 40 mm/sec

Printing pressure: 50 N

Environment: 25° C., 50% relative humidity

Heating Conditions

Mounter: NXTIIC (manufactured by Fuji Corporation)

Reflow oven: NIS-20-80C (manufactured by EIGHTECH TECTRON Co., Ltd.)

During Preheating

Temperature rise rate: 2° C./sec

Preheat temperature: 150 to 180° C.

During Solder Melting

Temperature rise rate: 2° C./sec

Solder melting time: 30 seconds

Peak temperature: 240° C.\

Atmosphere: Air atmosphere

Void Fraction

An X-ray transmission photograph was taken at the mounting position of each test piece prepared using the above Examples and Comparative Examples. The taken photograph was binarized, and a void fraction of a bonding portion was calculated.

As the evaluation criteria, in a test piece including a power transistor, a case where an area occupied by voids in the bonding portion was less than 20% was evaluated as good, and a case where the area occupied by voids in the bonding portion was 20% or more was evaluated as not acceptable (average of six individuals). In a test piece including a BGA, a case where the area occupied by voids in the bonding portion was less than 4% was evaluated as good, and a case where the area occupied by voids in the bonding portion was 4% or more was evaluated as not acceptable (average of 36 balls).

As shown in Table 1, in Examples, the generation of a void was suppressed as compared with Comparative Examples even when the power transistor was mounted or the BGA substrate was mounted. From this result, it can be said that generation of various types of voids can be suppressed in Examples.

Observation of Cellulose with Electron Microscope

The following celluloses were provided as samples.

Cellulose powder 1: NP fiber (manufactured by Nippon Paper Industries Co., Ltd.)

Cellulose powder 2: KC Flock (manufactured by Nippon Paper Industries Co., Ltd.)

Cellulose nanofiber 1: Cellenpia TC-01 (manufactured by Nippon Paper Industries Co., Ltd.)

Cellulose nanofiber 2: Rheocrysta (manufactured by DKS Co. Ltd.)

Cellulose microfiber 1: Exilva (2 wt %) (manufactured by Borregaard AS)

Cellulose microfiber 2: Exilva (10 wt %) (manufactured by Borregaard AS)

For each cellulose sample, a 0.1% by weight suspension was prepared with pure water, applied onto a copper plate, and then dried in an oven at 80° C. for 16 hours to prepare a test piece. The obtained test piece was subjected to platinum vapor deposition and then observed with an observation apparatus, and an electron micrograph was taken. The photograph is shown in FIGS. 1 to 14.

Observation apparatus: JSM-IT 300 LV (manufactured by JEOL Ltd.)

Observation magnification: 500 times, 2,000 times, 20,000 times

The observation magnification of each sample is as follows.

Observation result of cellulose powder 1 at 500 magnification (FIG. 1)

Figure 2:
FIG. 2 is an electron micrograph of the cellulose used in Comparative Example.

Observation result of cellulose powder 2 at 500 magnification (FIG. 2)

Figure 3:
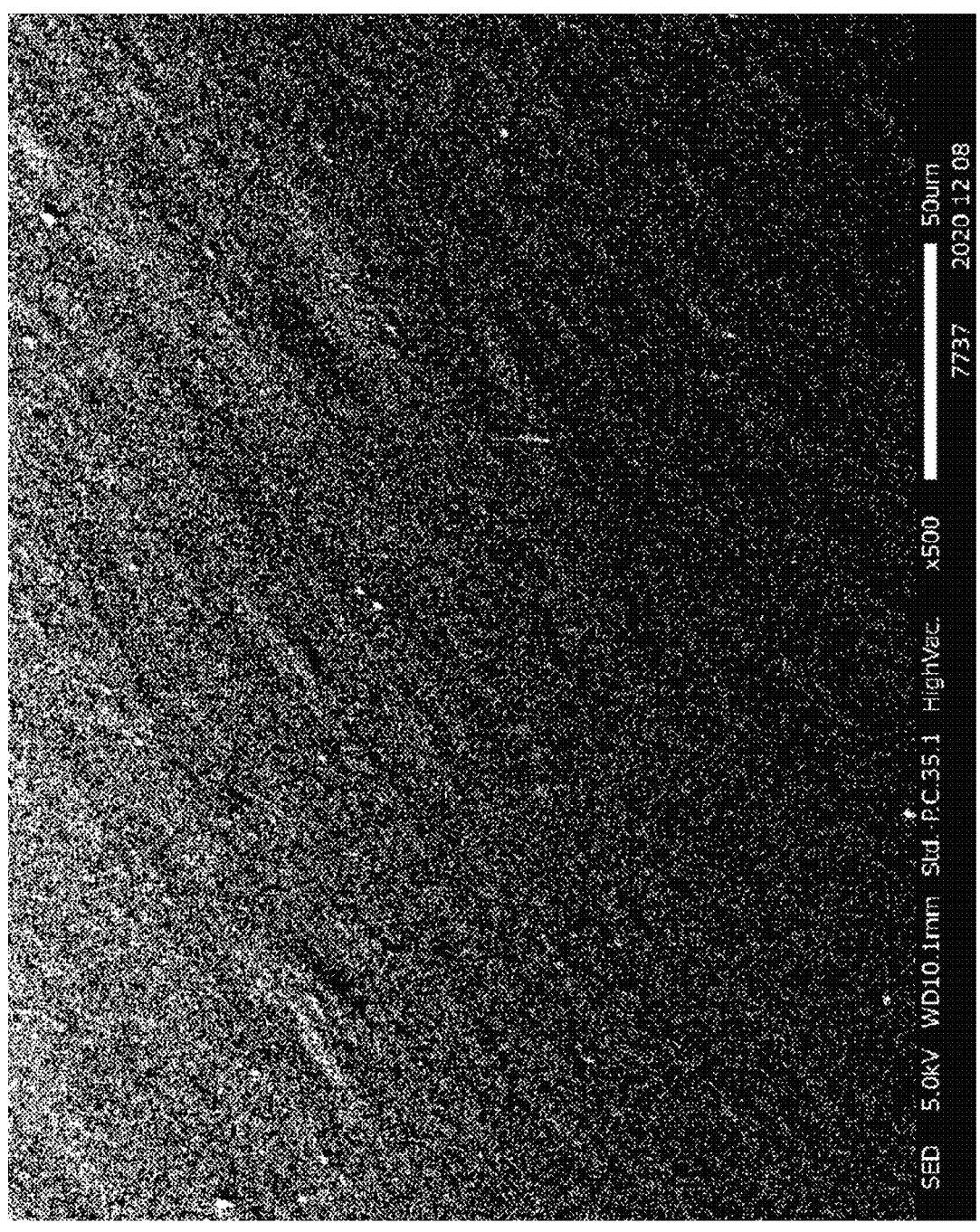
FIG. 3 is an electron micrograph of the cellulose used in Comparative Example.

Observation result of cellulose nanofiber 1 at 500 magnification (FIG. 3)

Figure 4:
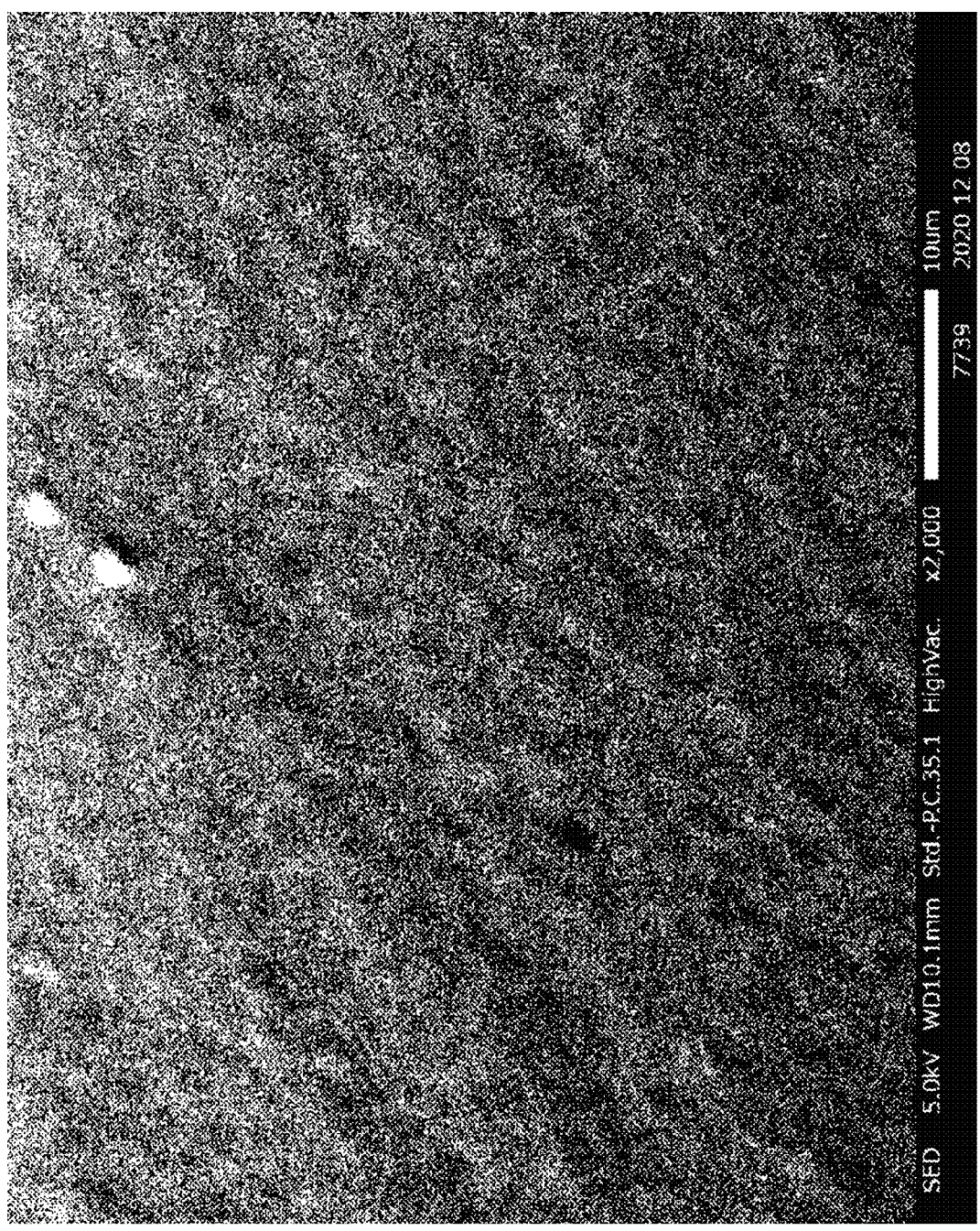
FIG. 4 is an electron micrograph of the cellulose used in Comparative Example.

Observation result of cellulose nanofiber 1 at 2,000 magnification (FIG. 4)

Figure 5:
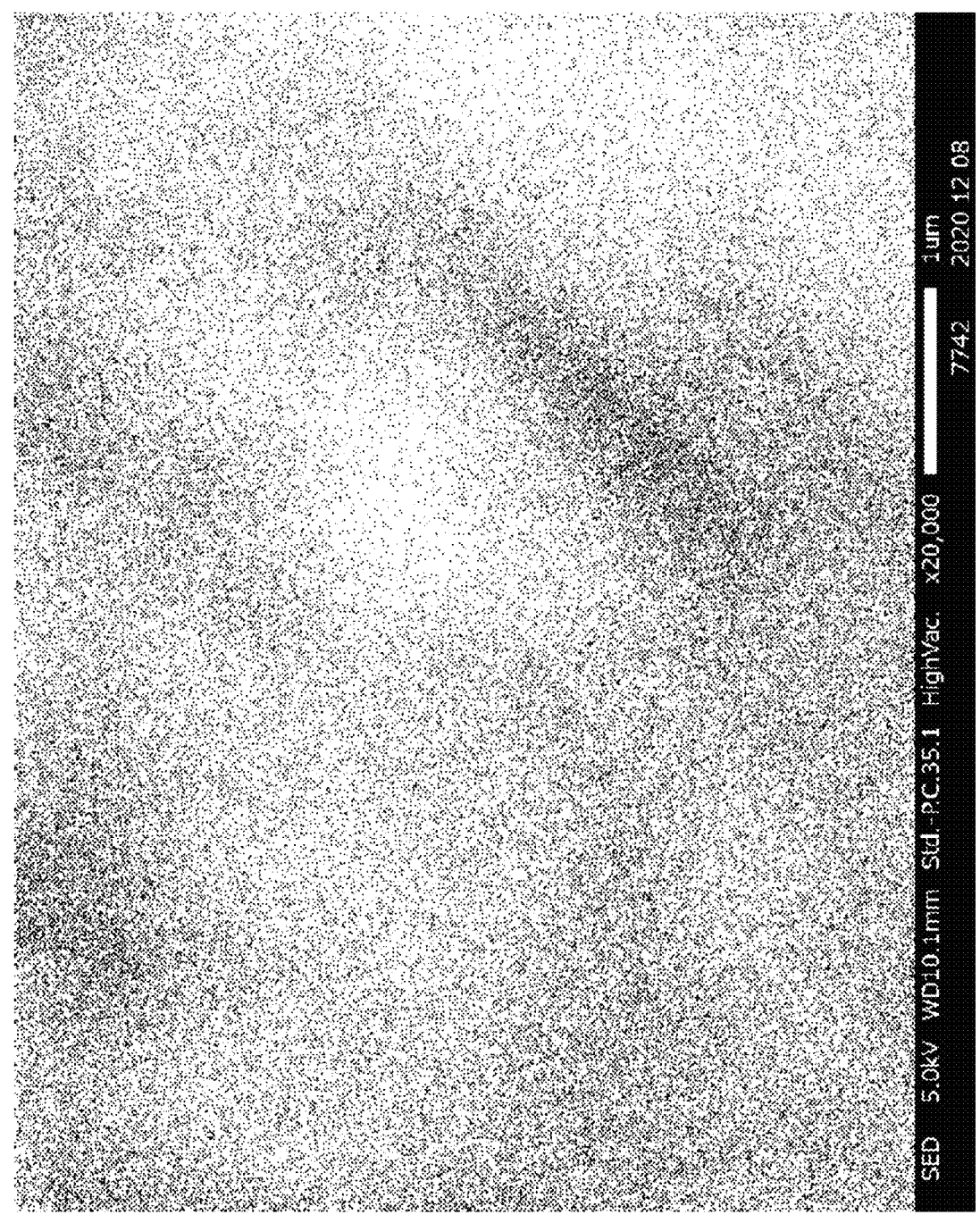
FIG. 5 is an electron micrograph of the cellulose used in Comparative Example.

Observation result of cellulose nanofiber 1 at 20,000 magnification (FIG. 5)

Figure 6:
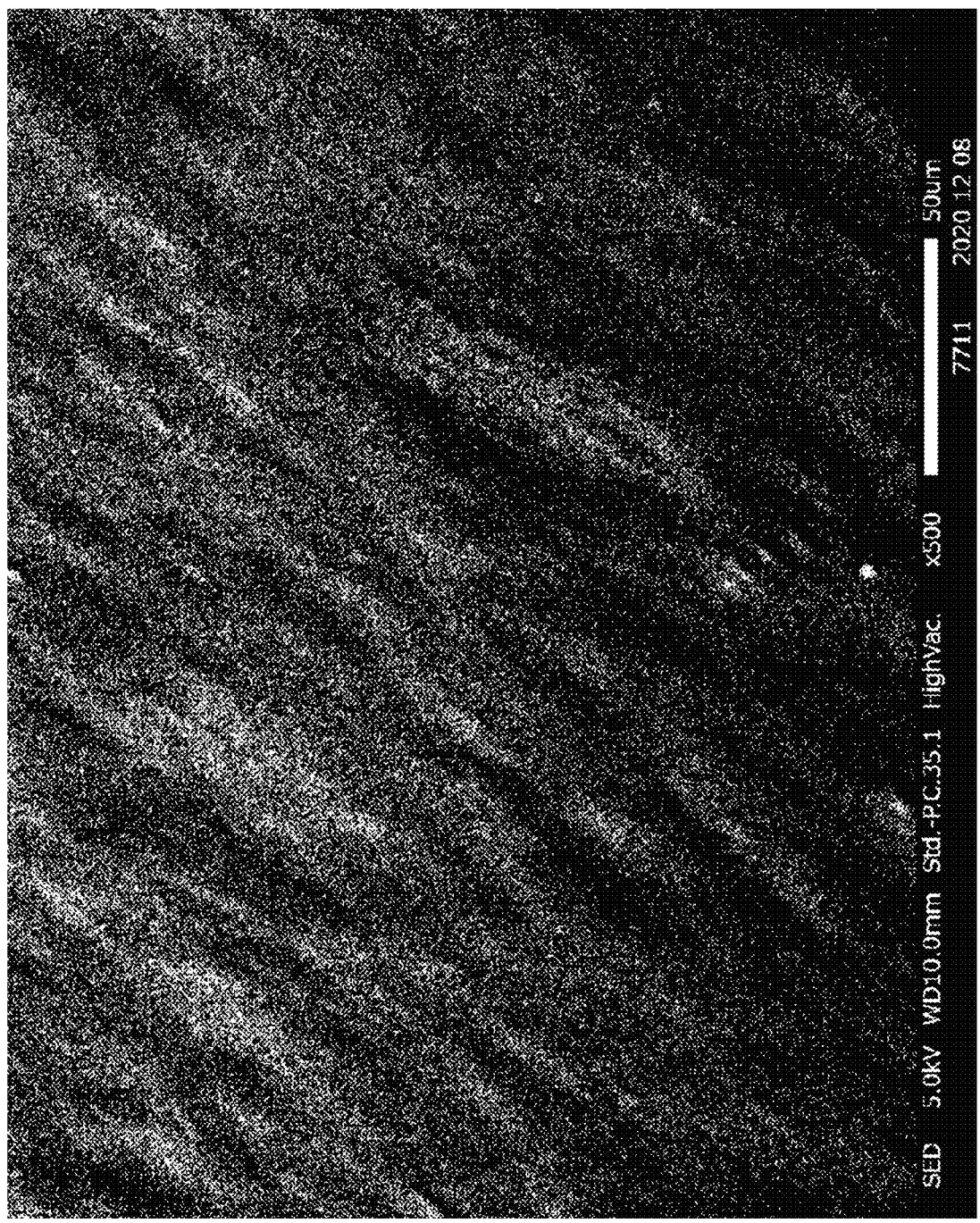
FIG. 6 is an electron micrograph of the cellulose used in Comparative Example.

Observation result of cellulose nanofiber 2 at 500 magnification (FIG. 6)

Figure 7:
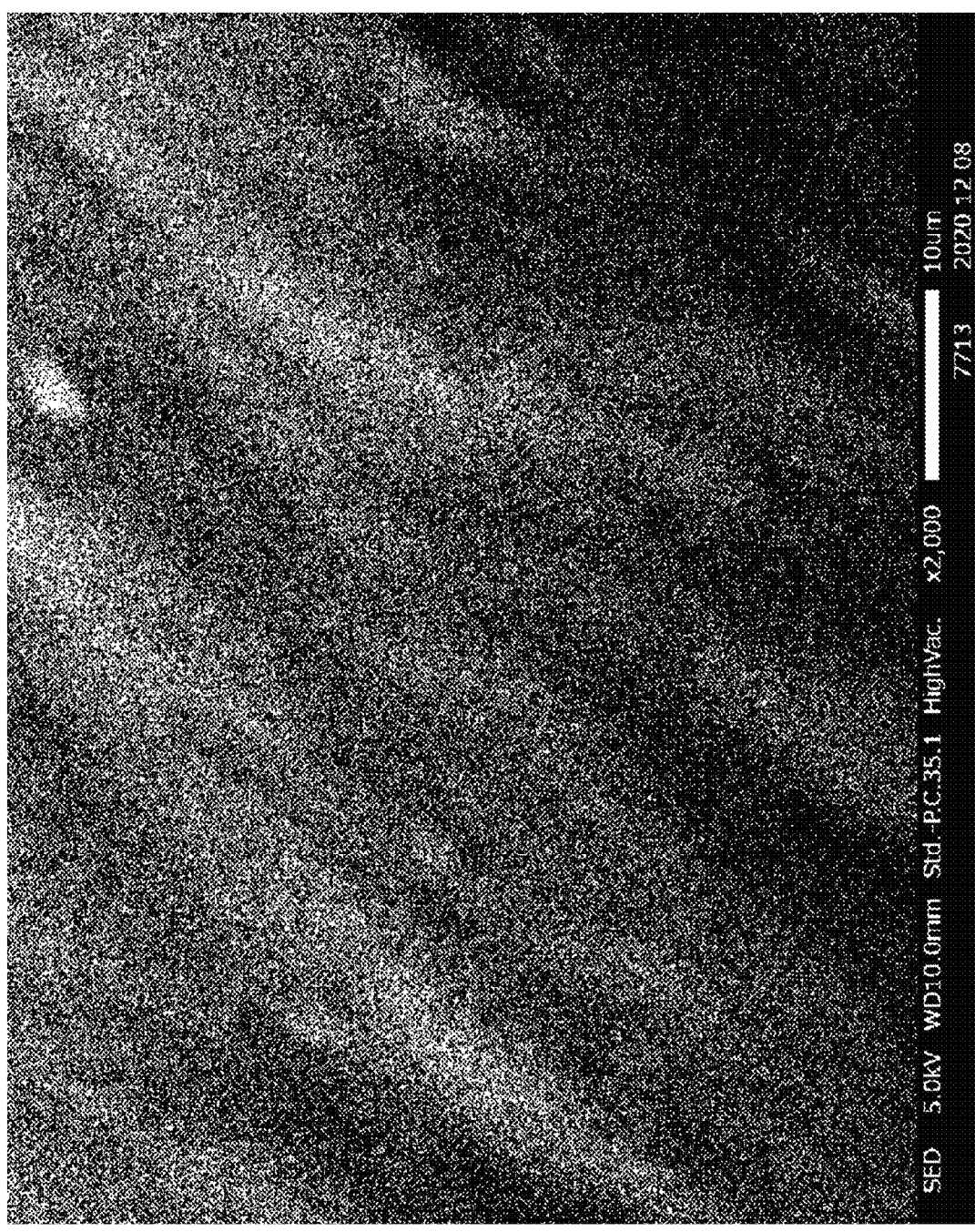
FIG. 7 is an electron micrograph of the cellulose used in Comparative Example.

Observation result of cellulose nanofiber 2 at 2,000 magnification (FIG. 7)

Figure 8:
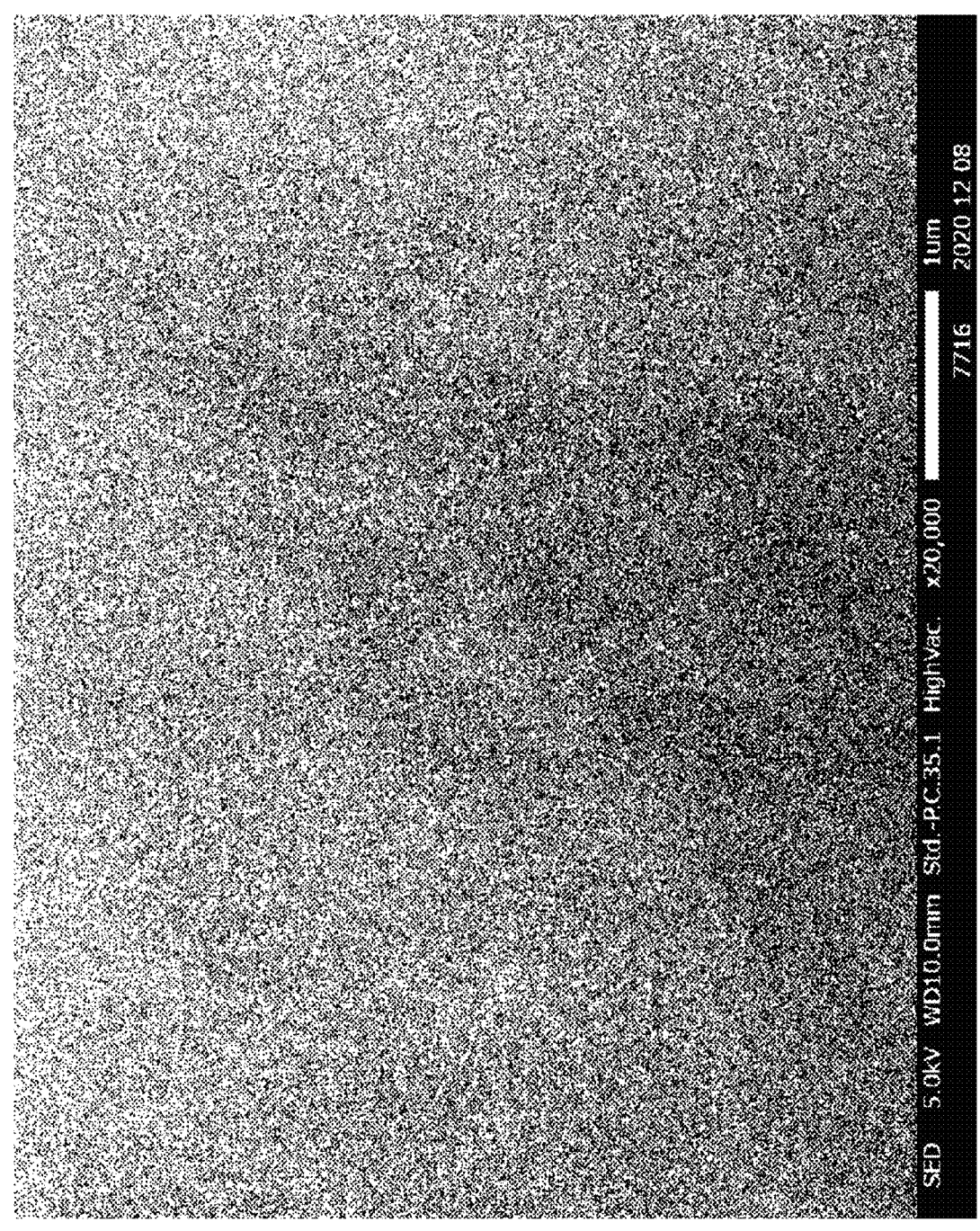
FIG. 8 is an electron micrograph of the cellulose used in Comparative Example.

Observation result of cellulose nanofiber 2 at 20,000 magnification (FIG. 8)

Figure 9:
FIG. 9 is an electron micrograph of the cellulose used in Comparative Example.

Observation result of cellulose microfiber 1 at 500 magnification (FIG. 9)

Figure 10:
FIG. 10 is an electron micrograph of the cellulose used in Example.

Observation result of cellulose microfiber 1 at 2,000 magnification (FIG. 10)

13

Figure 11:
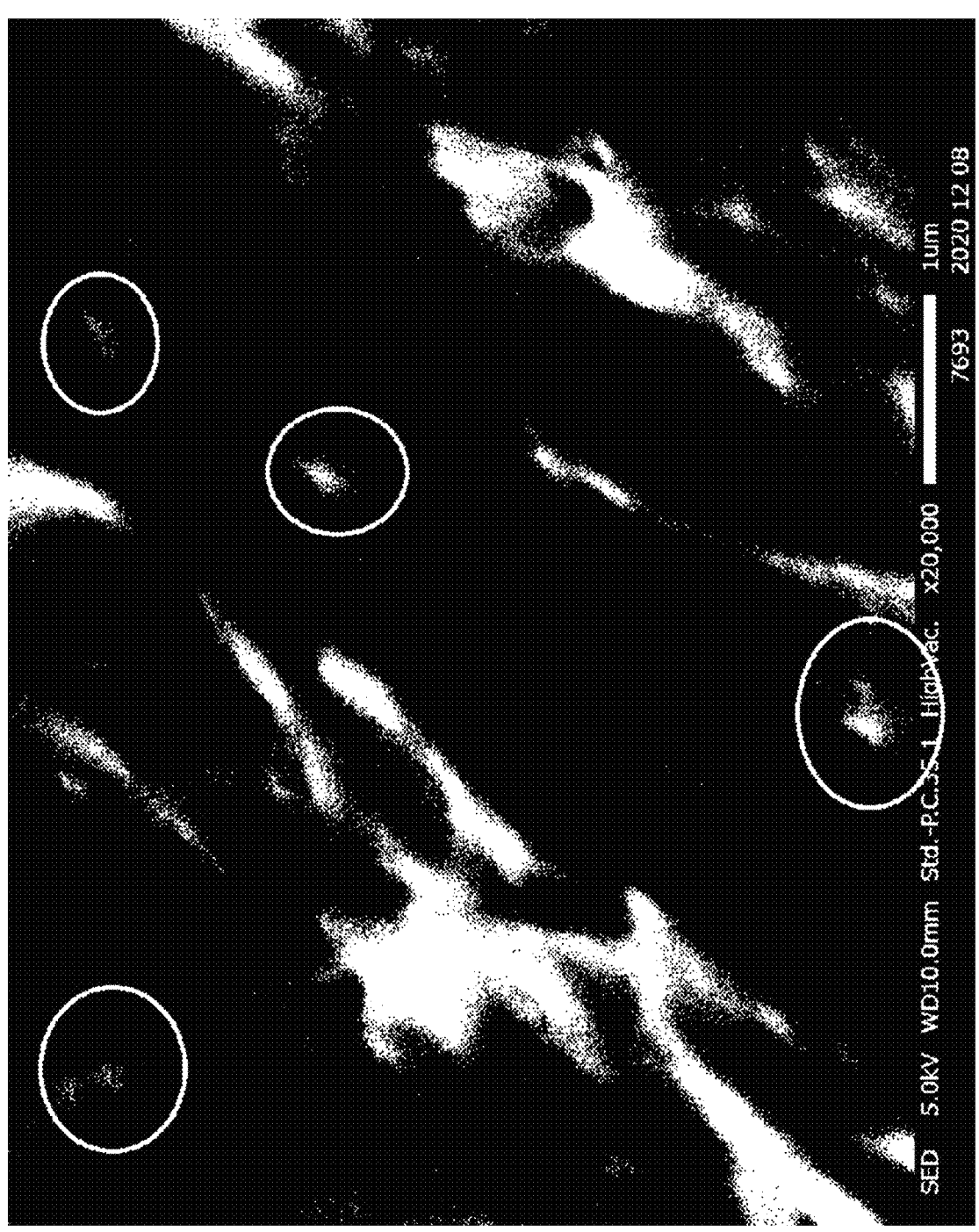
FIG. 11 is an electron micrograph of the cellulose used in Example.

Observation result of cellulose microfiber 1 at 20,000 magnification (FIG. 11)

Figure 12:
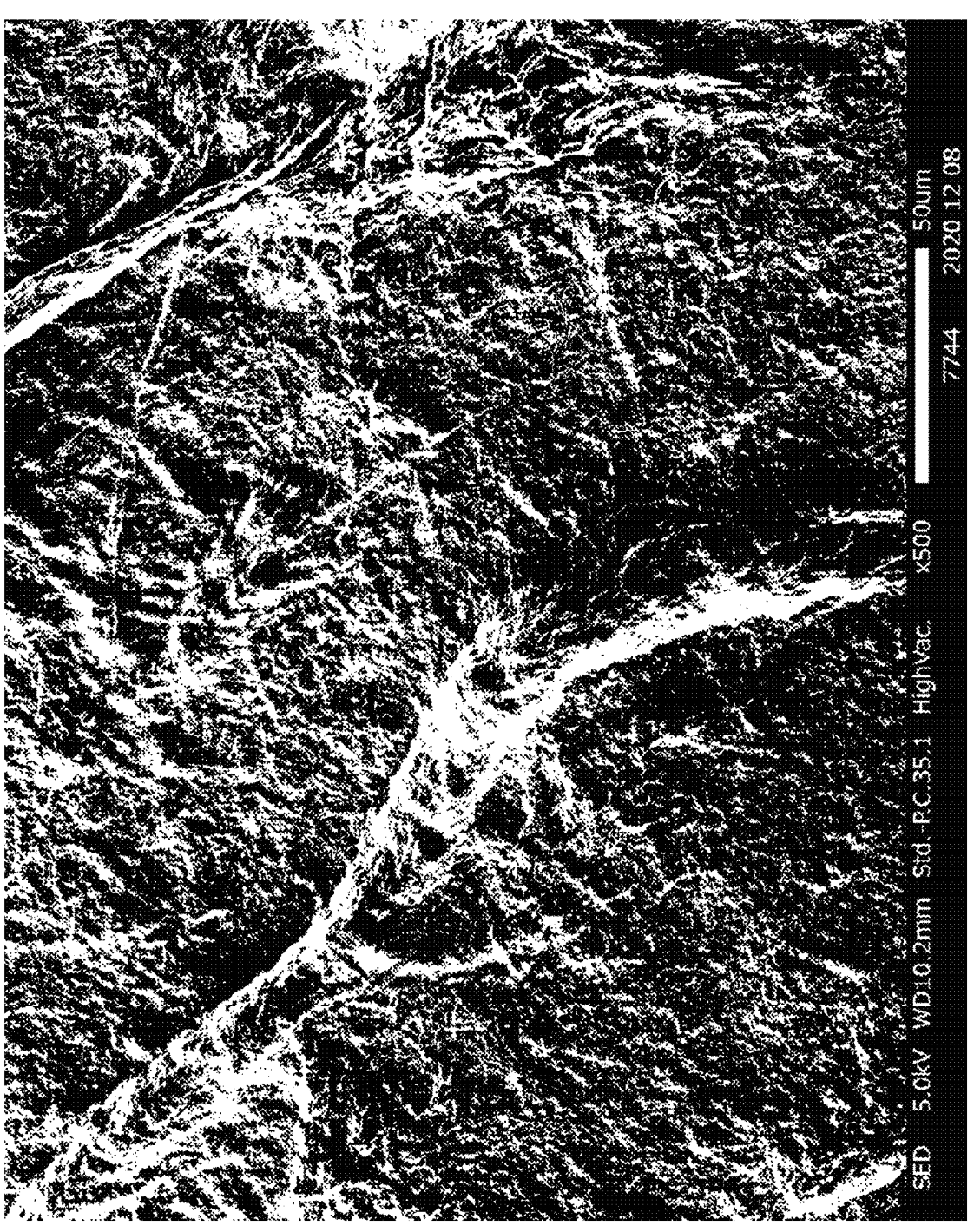
FIG. 12 is an electron micrograph of the cellulose used in Example.

Observation result of cellulose microfiber 2 at 500 magnification (FIG. 12)

Figure 13:
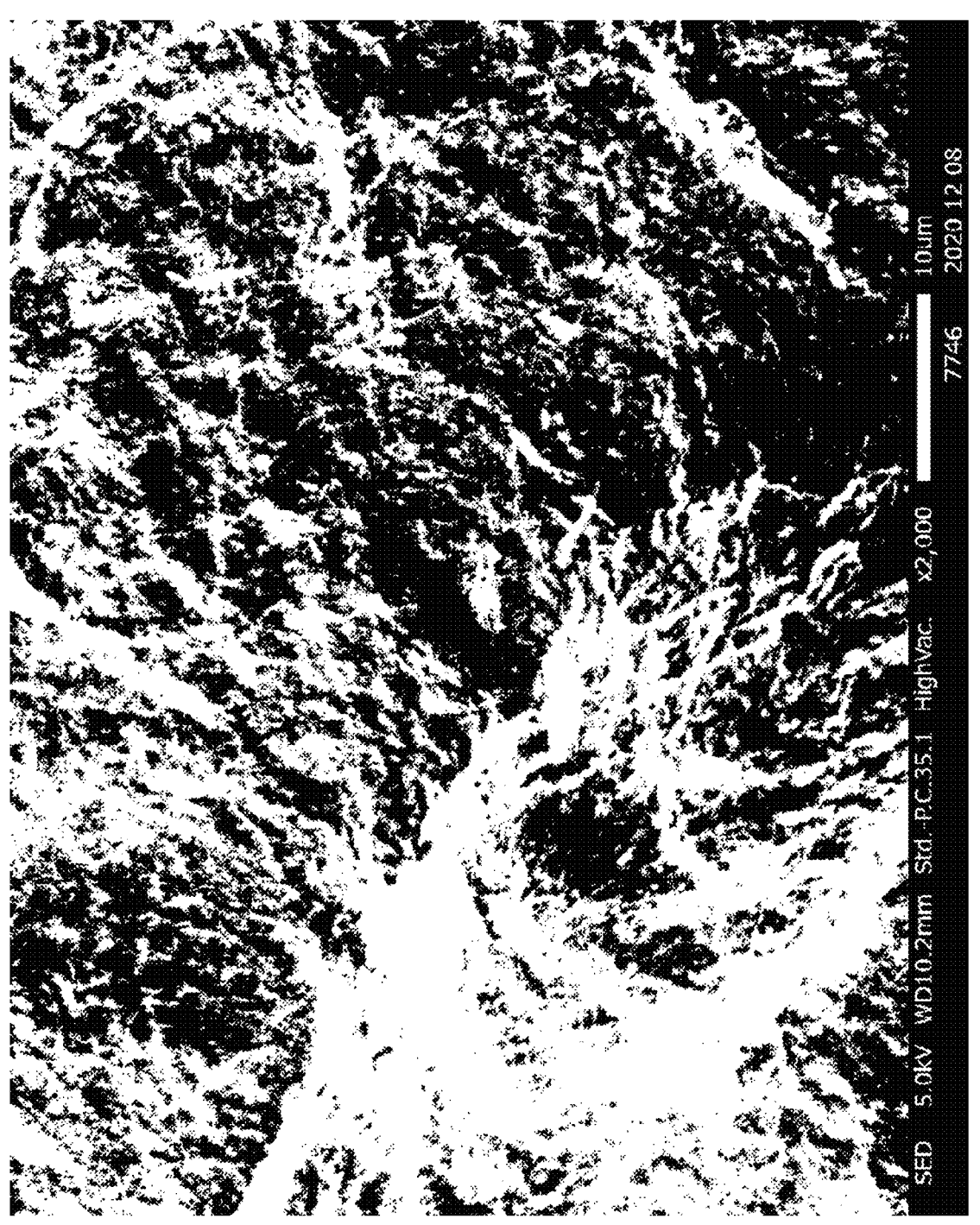
FIG. 13 is an electron micrograph of the cellulose used in Example.

Observation result of cellulose microfiber 2 at 2,000 magnification (FIG. 13)

Figure 14:
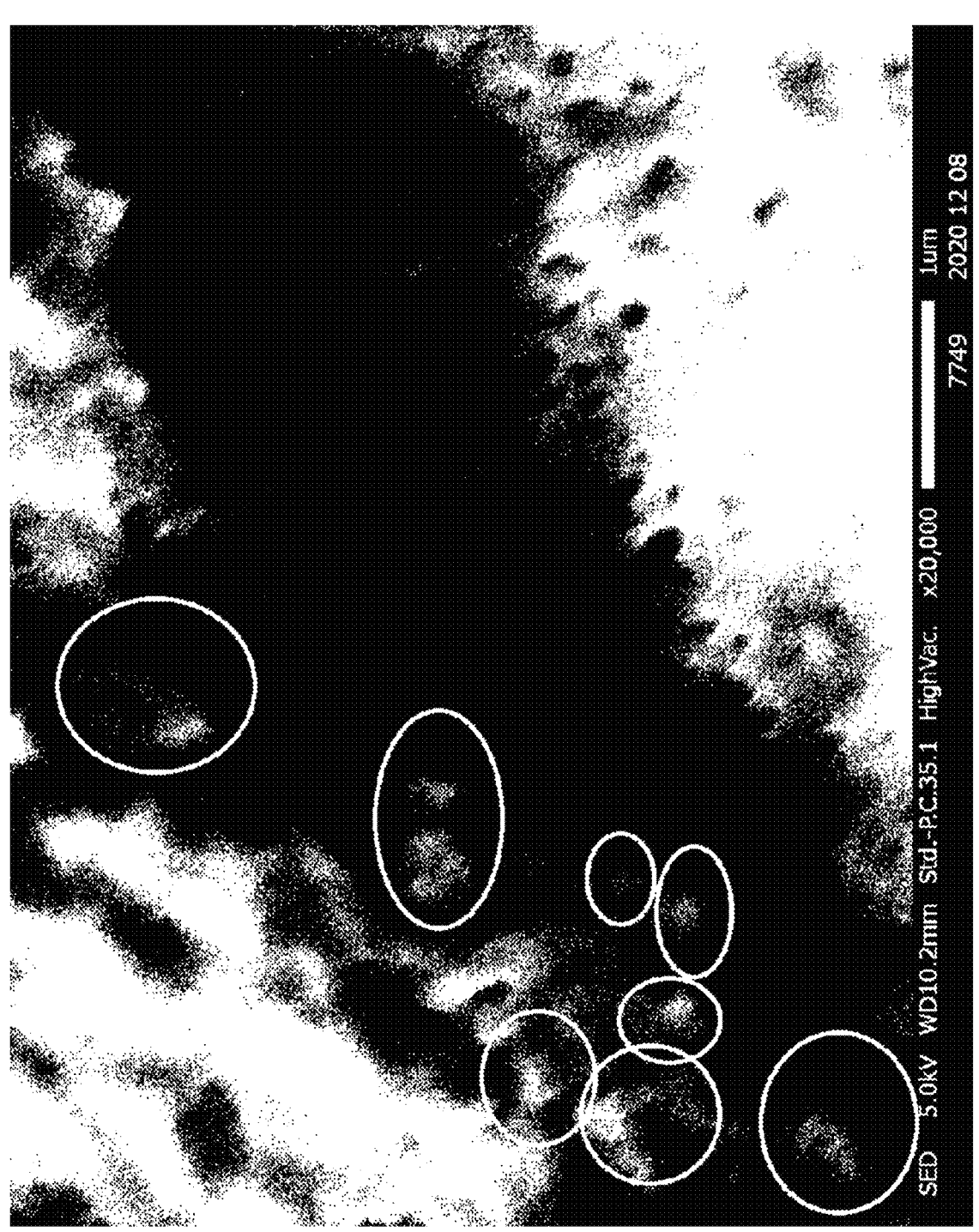
FIG. 14 is an electron micrograph of the cellulose used in Example.

Observation result of cellulose microfiber 2 at 20,000 magnification (FIG. 14)

In the cellulose powder shown in FIGS. 1 and 2, while a granular structure was observed, no fiber piece was observed.

In the nanofibers shown in FIGS. 3 to 8, particles and fibers were not observed at the observation magnification. It is presumed that individual particles or fibers cannot be observed at this magnification because of very fine particles or aggregates of fibers.

In the cellulose microfibers shown in FIGS. 9 to 14, a fibrous structure was observed at the observation magnification.

In FIGS. 9 and 12, a state in which large fiber pieces having a scale of several tens of μm observed as a linear body and very finer fiber pieces are complicatedly intertwined is observed. In FIGS. 10 and 13, it was observed that there were fiber pieces having a size of about several μm and finer fiber pieces, and in FIGS. 11 and 14 at a higher magnification, it was observed that the smallest fiber piece had a size of 1 μm or less (portion surrounded by a circle in the drawing). That is, it was observed that massive fibers in which fibers having different sizes were mixed existed.

The invention claimed is:

1. A flux comprising microfibrillated cellulose (MFC) in which fibrous cellulose having a length of 1 μm or more and less than 1 mm and fibrous cellulose having a length of 1 nm or more and less than 1 μm are mixed.

2. The flux according to claim 1, wherein 400 ppm or more and 10,000 ppm or less of the microfibrillated cellulose (MFC) is contained.

3. The flux according to claim 1, further comprising a solvent, a rosin-based resin, and an activator.

4. The flux according to claim 2, further comprising a solvent, a rosin-based resin, and an activator.

* * * * *